(No Model.)
W. M. JACKSON.
INCANDESCENT BURNER.
No. 249,362. Patented Nov. 8, 1881.
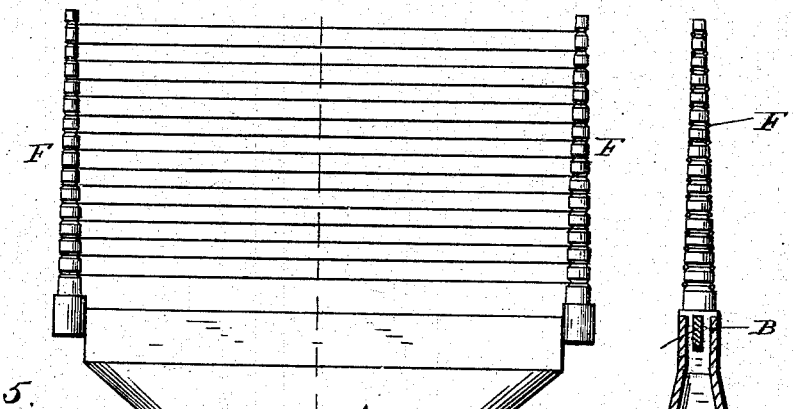
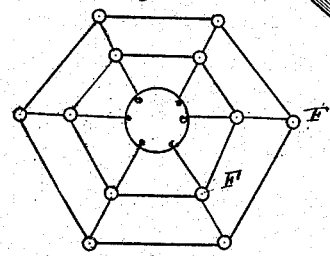
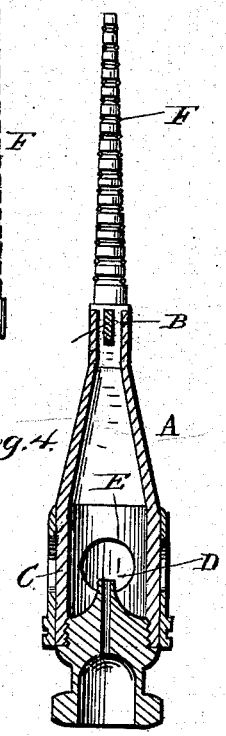
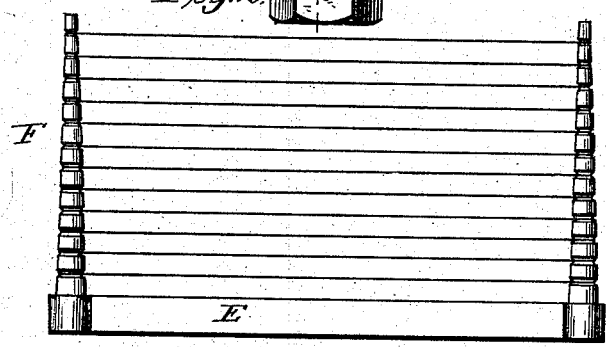
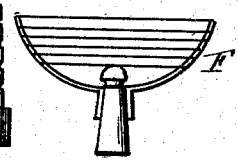
Witnesses.
Franck L. Ouraud,
Chas. L. Combs.
Inventor.
Walter M. Jackson
By C. M. Alexander
Attorney
N. PETERS. Photo-Lithographer, Washington, D. C.

UNITED STATES PATENT OFFICE.

WALTER M. JACKSON, OF PROVIDENCE, RHODE ISLAND.

INCANDESCENT BURNER.

SPECIFICATION forming part of Letters Patent No. 249,362, dated November 8, 1881.

Application filed May 27, 1881. (No model.)

*To all whom it may concern:*

Be it known that I, WALTER M. JACKSON, of Providence, in the county of Providence, and in the State of Rhode Island, have invented certain new and useful Improvements in Incandescent Burners; and I do hereby declare that the following is a full, clear, and exact description thereof, reference being had to the accompanying drawings, and to the letters of reference marked thereon, making a part of this specification.

This invention relates to an improved device or system of devices for producing illumination by the incandescence of a suitable substance or substances heated to a proper temperature by means of burning gases or vapors, and it is specially designed to utilize for illuminating purposes the non-luminous gases, such as hydrogen, carbonic oxide, or a mixture of such gases, the latter being known, technically, as "water-gas," which either possess no carbon whatever, or do not contain it in such condition as to be rendered luminous when burning. My invention, however, may be employed with equal advantage in connection with the ordinary carbureted-hydrogen gases or hydrocarbon vapors, when commingled with a proper equivalent of atmospheric air or oxygen sufficient to effect the thorough consumption of the carbon, the burning carbon in such instances being utilized, in conjunction with the hydrogen contained in such gases or vapors, to form a heating agent to render the substance incandescent. These objects I attain by the apparatus illustrated in the accompanying drawings, in which—

Figure 1 represents a side elevation of my improved apparatus or device; Fig. 2, a detached view of the device supporting the substance to be rendered incandescent. Fig. 3 represents a top view of the device with the substance to be rendered incandescent removed; Fig. 4, a transverse vertical sectional view of the device; Fig. 5, a modification of my invention, showing a number of burners grouped together; and Fig. 6 represents a modification of my invention applied to an ordinary gas-burner.

The letter A indicates an angular hollow shell, which is provided with a narrow slot or opening, B, at its top, and at its bottom with a tubular extension, C, screw-threaded internally for the reception of an externally screw-threaded jet-tube, D, which may be secured on a suitable pipe, through which gas or vapor from a generator or reservoir may be admitted to the hollow shell.

The tubular extension C, at diametrically opposite sides, is provided with openings E for the admission of air, which will be carried in by the draft caused by the current of gas passing upward through the jet-tube D. The said extension, on its outside, is provided with a loose perforated sleeve, the perforations corresponding with the apertures in the extension, so that by turning the sleeve the quantity of air admitted to the device may be regulated with accuracy.

At each side, at the top of the device, the slot B is contracted, forming a seat for the rectangular cross bar or tie E', to the ends of which are secured the vertical standards F, which support the material to be rendered incandescent. This cross-bar serves the double purpose of supporting the standards F and of dividing the opening or slot B, so as to permit the gas or vapor to issue at each side. The standards taper upwardly and are grooved at intervals for the reception of the substance to be rendered incandescent. This substance I have found by practical experience to consist, preferably, of fine platinum, iridium, silver, or gold wire, or other material that will not oxidize at high temperatures. In order to secure the proper incandescence the wires have to be so exceedingly fine that they have to be artificially supported, and in order to get the full effect of the flame it is necessary that they should be stretched in straight lines between the supports. The wire is wrapped successively in the grooves in the standards, one turn entirely around the standard being given at each groove, in order to prevent the wire from loosening at its supports and sagging or dropping under the influence of the intense heat necessary to render it incandescent. The wire is so arranged upon the standards as to form two vertical series, one extending over each of the openings in the divided slot at the top of the shell A. Owing to the tapering form of the said standards, it will be evident that the wires of the two series will successively approach toward the top of said standards, and thus be subjected to the proper action of the flame without interfering with each other.

I have so disposed the wires, as above mentioned, for the reason that it is a well-known fact that all flames are hollow, and if the wire were placed directly in the center of the flame it would only become partially incandescent. For this reason the device is constructed so as to only produce a very thin flame, and the wires are arranged, as before mentioned, slightly out of line vertically, so as to create a crosscutting of the flame, thereby exposing the wires to the solid parts of the flame, and not to the hollow space. By experience I have discovered that the finer the wire the more brilliant will be the light; but when constructed of the fineness necessary to brilliant illumination it will be relaxed by the intense heat if unsupported properly, and hence I employ the standards above mentioned. A wire about five one-thousandths of an inch has been found to answer well in practice; if materially larger, the proper incandescence cannot be obtained; if materially smaller, it is apt to sag or break; but a slight variation from this size may be made without departing from my invention.

I have above described my invention simply as applied to a single device; but, when desired, the gas-eductions may be multiplied, as well as the standards and wires, so as to form one line within another with the proper heating-flames, as indicated in the drawings.

The incandescence may be increased by means of a chimney applied over the device, and when the pressure of gas or vapor is slight one or more gas-jet tubes may be employed to increase the draft through the device.

The cross bar or tie supporting the standards carrying the wires, being removable, may be detached if the wires become injured, and a new one substituted, while the one removed may be rewrapped with wire for further use.

The modification represented in Fig. 6 shows my improved device applied to an ordinary gas-burner, the standards in this instance being supported by means of a suitable collar on the burner, the said standards being curved, as shown, and tapering, for the purposes above mentioned.

In burners of this class as heretofore constructed the incandescent material has been arranged above the burner in such manner as to cross the flame and extend through the hollow portion thereof. The said hollow portion has comparatively little heating effect, and hence the portions of the material extending through the same are not rendered properly incandescent, and the incandescent material is not fully utilized. Such burners have also been made in which the incandescent material is in the form of a hollow basket designed to inclose the flame, and combined with spongy or other finely-divided platinum. Such construction tends to break up the flame and the continuity of the shell, which would practically defeat the object I seek. The inclosing-basket has also been made to correspond approximately with the shape of the flame produced by a bat-wing burner; but the incandescent material has not been so arranged as to fall in line with the outer shell of the flame throughout from the bottom to the top of the flame. Such arrangement forms the gist of my invention, and hence I do not desire to claim a burner provided with incandescent material arranged to fall within the flame, broadly; nor do I seek to claim a burner provided with a basket of incandescent material having the general conformation of the flame produced and inclosing the same.

Having thus described my invention, what I claim, and desire to secure by Letters Patent, is—

1. An incandescent burner consisting of a series of fine wires or other incandescent material, suitably supported and arranged in straight lines, so as to fall in the outer shell of the flame, and in a series gradually approaching from the bottom to the top, substantially as specified.

2. In combination with the incandescent material, suitable artificial supports for the same, whereby it is properly held in the flame of a burner, substantially as specified.

3. In combination with a hollow shell provided with a narrow opening or slot at the top for the escape of the gas or vapor to be burned, and with a suitable induction for such gas or vapor, the dividing bar or tie and the standards for supporting the substance to be rendered incandescent, substantially as specified.

4. In combination with the hollow casing and its gas-escape opening, the tapering grooved standards, and the wires wrapped and arranged around the same in such manner as to gradually approach each other toward the top and extend through the outer portions of the hollow flame, so as to be rendered thoroughly incandescent, substantially as specified.

5. In combination with the hollow shell and the standards and wires attached thereto, the perforated extension and perforated sleeve, and the gas or vapor jet projecting into said extension, whereby a current of air may be commingled with the gases or vapors to be burned, substantially as and for the purposes specified.

6. In combination with the hollow casing, having a narrow opening at the top and suitable seats at each side, the removable crossbar, and standards for supporting the wires to be rendered incandescent, whereby the parts are adapted to be separated for the purposes of repairs, substantially as specified.

In testimony whereof I affix my signature, in presence of two witnesses, this 25th day of May, 1881.

WALTER MARSH JACKSON.

Witnesses:
C. E. WADSWORTH,
R. B. LAWRENCE.